United States Patent
Nishiyama et al.

(10) Patent No.: US 6,623,869 B1
(45) Date of Patent: Sep. 23, 2003

(54) METAL MATERIAL HAVING GOOD RESISTANCE TO METAL DUSTING

(76) Inventors: Yoshitaka Nishiyama, c/o Sumitomo Metal Industries, Ltd., 5-33, Kitahama 4-chome, Chuo-ku, Osaka-shi, Osaka 541-0041 (JP); Nobuo Otsuka, c/o Sumitomo Metal Industries, Ltd., 5-33, Kitahama 4-chome, Chuo-ku, Osaka-shi, Osaka 541-0041 (JP)

(*) Notice: Subject to any disclaimer, the term of this patent is extended or adjusted under 35 U.S.C. 154(b) by 0 days.

(21) Appl. No.: 10/361,494

(22) Filed: Feb. 11, 2003

Related U.S. Application Data

(63) Continuation of application No. PCT/JP02/05986, filed on Jun. 14, 2002.

(30) Foreign Application Priority Data

Jun. 19, 2001 (JP) ........................................ 2001-185460
May 30, 2002 (JP) ........................................ 2002-156680

(51) Int. Cl.$^7$ ..................... B32B 15/01; C22C 30/00; C22C 38/40
(52) U.S. Cl. ........................ 428/685; 138/143; 138/178; 148/327; 148/427; 148/442; 420/43; 420/97; 420/128; 420/442; 420/452; 420/584.1; 428/615; 428/636; 428/637; 428/638; 428/679; 428/680; 428/681; 428/682; 428/683; 428/684
(58) Field of Search ................................. 428/685, 615, 428/636, 637, 638, 679, 680, 681, 682, 683, 684; 138/143, 178; 420/43, 97, 128, 442, 452, 584.1; 148/327, 427, 442

(56) References Cited

U.S. PATENT DOCUMENTS 6,296,953 B1 * 10/2001 Lindén et al. ............... 428/685
6,303,237 B1 * 10/2001 Forsberg et al. ............ 428/685

FOREIGN PATENT DOCUMENTS

| JP | 6-158236 | 6/1994 |
| JP | 09-078204 | 3/1997 |
| JP | 11-172473 | 6/1999 |
| JP | 2001-247940 | 9/2001 |
| JP | 2001-279364 | 10/2001 |

* cited by examiner

*Primary Examiner*—Robert R. Koehler

(57) ABSTRACT

A metallic material of the invention which comprises, in mass %, C: not more than 0.2%, Si: 0.01–4%, Mn: 0.05–2%, P: not more than 0.04%, S: not more than 0.015%, Cr: 10–35%, Ni: 30–78%, Al: not less than 0.005% but less than 4.5%, N: 0.005–0.2%, and one or both of Cu: 0.015–3% and Co: 0.015–3%, with the balance substantially being Fe, and of which the value of 40Si+Ni+5Al+40N+10 (Cu+Co), wherein the symbols of elements represent the contents of the respective elements, is not less than 50 and has excellent corrosion resistance in an environment in which metal dusting is ready to occur and, therefore, can be utilized as or in heating furnace pipes, piping systems, heat exchanger pipes and so forth to be used in a petroleum refinery or in petrochemical plants, and can markedly improve the equipment durability and safety.

24 Claims, No Drawings

METAL MATERIAL HAVING GOOD RESISTANCE TO METAL DUSTING

This PCT application was not in English as published under PCT Article 21(2).

This application is a continuation of the international application PCT/JP02/05986 filed on Jun. 14, 2002, the entire content of which is herein incorporated by reference.

TECHNICAL FIELD

This invention relates to a metallic material, which is a high Cr-high Ni—Fe alloy, and a double- or multi-layer metallic material, and a metal tube or pipe made thereof, which each could be used as a container, a reforming tube, a part or the like, exposed to a high-temperature atmosphere in a heat exchanger type reforming unit for hydrocarbon or waste heat recovery system or the like, in a petroleum refinery or petrochemical plant, for instance.

BACKGROUND ARTS

Demand for gases capable of serving as clean energy fuels, for example hydrogen and methanol, is expected to grow very rapidly in the future. To meet such demand, larger-sized reforming units for hydrocarbon further improved in heat efficiency and still more suited for mass production are required. Even in reforming units for hydrocarbon in existing petroleum refining or petrochemical plants, in ammonia production plants, hydrogen production plants or other plants in which petroleum or the like is used as the raw material, the number of heat exchangers in use for waste heat recovery is increasing so that the energy efficiency is continuing to increase.

For efficient utilization of the heat of such high-temperature gases, it is important to carry out heat exchange in a temperature range of 400–700° C., which is lower than the range so far taken into consideration. Thus, corrosion caused by carburizing of high Cr-high Ni—Fe alloy metallic materials, used in reforming tubes, heat exchangers and the like in this temperature range is now a problem.

Usually, in such reactors as mentioned above, a reaction gas, namely a gas containing $H_2$, CO, $CO_2$, $H_2O$ and hydrocarbons, such as methane, could be in contact with metallic materials, such as reforming tubes, at a temperature of about 1,000° C. or above. In this temperature range, an element or elements which have a greater oxidation tendency than Fe, Ni and the like are oxidized selectively on the metallic material surface, and corrosion is prevented by the formation of compact oxide films, such as Cr oxide and/or Si oxide. In parts where the temperature is relatively low, such as in heat exchanging parts, however, the diffusion of elements from the inside to the surface of the metallic material becomes insufficient, so that the formation of oxide films, effective in preventing corrosion is delayed, with the result that C atoms are adsorbed on the metallic material surface from the gas and thus C penetrates into the metallic material and causes carburizing.

When the carburizing progresses in such an environment and a carburizing layer, containing carbides of Cr, Fe and/or the like is formed, the volume of that portion expands and develops a tendency to cause microcracks. Furthermore, when C penetrates into a metallic material and the formation of carbides reaches a point of saturation, a metal powder, resulting from decomposition of the carbides, peels off from the metallic material surface and corrosion/wear, called metal dusting, appears. Further, the metal dust, resulting from such peeling, acts as a catalyst and promotes the precipitation of carbon on the metallic material surface. As such wear and/or tube/pipe clogging by precipitation of carbon advances, trouble may occur in a unit or plant, possibly leading to a shutdown. Therefore, due consideration must be given in selecting the material for constructing the unit.

Various measures have been attempted to prevent metal dusting, up to this time. In Japanese laid-open patent application (JP Kokai) H09-78204, for instance, there is disclosed of an invention relating to a Fe-based alloy containing not less than 24% (by weight; hereinafter the same shall apply unless otherwise specified) of Cr and not less than 35% of Ni, a Ni-based alloy containing not less than 20% of Cr and not less than 60% of Ni, and a material derived from such a Fe-based alloy or Ni-based alloy by further addition of Nb, since Fe-based or Ni-based alloys containing 11–60% of Cr are excellent in metal dusting resistance in atmospheric gases containing $H_2$, CO, $CO_2$ and $H_2O$ at 400–700° C. Generally, however, mere increases in Cr and/or Ni content in Fe-based or Ni-based alloys will not bring about any satisfactory carburizing-inhibiting effect. Therefore, it is necessary to take other measure to still further prevent metal dusting.

The method or technology disclosed in JP Kokai H11-172473 consists in preventing corrosion, for "high-temperature alloys" containing iron, nickel and chromium, resulting from metal dusting, by causing one or more metals of the groups VIII, $I_B$, IV and V of the periodic table of the elements or a mixture thereof, to adhere to the surface by conventional physical or chemical means and annealing the same in an inert atmosphere, for the formation of a thin layer which has a thickness of 0.01 to 10 μm. Thin layers made of Sn, Pb, Bi and the like are allegedly highly effective, among others. This method is initially effective but, when the thinlayer is peeled off after a long period of use, the effect is lost.

Further, a method comprising adding $H_2S$ to the atmospheric gas is also conceivable. However, since $H_2S$ may possibly markedly decrease the activity of the catalyst used for hydrocarbon reforming, the application of such method is restricted. As discussed above, in spite of various investigations, a metallic material capable of satisfactorily inhibiting metal dusting is not available at this time.

DISCLOSURE OF THE INVENTION

In view of the foregoing, it is an object of the present invention to provide a metallic material, which is a high Cr-high Ni—Fe alloy, and a double- or multi-layer metallic material, and a metal tube or pipe made thereof, each of which shows good corrosion resistance in an environment in which metal dusting readily occurs, for example in a gaseous atmosphere containing $H_2$, CO, $CO_2$, $H_2O$ and hydrocarbons, among others.

The gist of the present invention is summarized below:

(I) A metallic material having metal dusting resistance which comprises, in mass %, C: not more than 0.2%, Si: 0.01–4%, Mn: 0.05–2%, P: not more than 0.04%, S: not more than 0.015%, Cr: 10–35%, Ni: 30–78%, Al: not less than 0.005% but less than 4.5%, N: 0.005–0.2%, and one or both of Cu: 0.015–3% and Co: 0.015–3%, with the balance substantially being Fe, and of which the fn1 value defined by the formula (1) given below is not less than 50:

$$fn1 = 40Si + Ni + 5Al + 40N + 10(Cu+Co) \quad (1),$$

wherein, in the above formula (1), the symbols of the elements represent the contents, in mass %, of the elements in the metallic material.

(II) The metallic material having metal dusting resistance as described above under (I), which is intended for use in an atmosphere at 1,000° C. or below, in which the total content of hydrocarbons, CO and $H_2$ is not less than 25% by volume and the total content of hydrocarbons and CO is not less than 1% by volume.

(III) A double- or multi-layer metallic material comprising one layer or a plurality of layers made of the metallic material, having metal dusting resistance as described above under (I), with at least one of the outermost layers being a layer of the above-mentioned metallic material, having metal dusting resistance.

(IV) A metal tube or pipe of which the material is the metallic material having metal dusting resistance as described above under (I).

(V) A double- or multi-layer metal tube or pipe of which the material is the double- or multi-layer metallic material, as described above under (III), with the outer surface being a layer of the metallic material having metal dusting resistance.

In order to increase the metal dusting resistance of the metallic material, having metal dusting resistance as described above under (I), it is possible to cause at least one of the group (a) components specified below to be included in lieu of part of Fe of that metallic material.

(a) Mo: 0.05–10%, Ta: 0.05–5%, W: 0.05–5%, Ti: 0.01–3%, V: 0.01–1%, Zr: 0.01–3%, Nb: 0.01–3% and Hf: 0.01–1%.

In cases where at least one of the above group (a) components are contained in the metallic material, improved metal dusting resistance can be secured when the value of fn2, defined below by the formula (2), where the symbols of the elements represent the contents, in mass %, of the elements in the metallic material, is not less than 0.003.

$$fn2=(Mo/192)+(Ta/181)+(W/368)+(Ti/48)+(V/51)+(Zr/92)+(Nb/93)+(Hf/179) \qquad (2).$$

Furthermore, when the Fe content in the metallic material is over 0% but not more than 10%, still better metal dusting resistance can be secured.

For preventing cracking during hot working and providing the metallic material with good hot workability, it is recommended that at least one of the following (b) group components be included in lieu of part of Fe of the metallic material.

(b) B: 0.0005–0.02%, Ca: 0.0005–0.02% and Mg: 0.0005–0.02%.

When at least one of the following (c) group components is contained in the metallic material in lieu of part of Fe, good corrosion resistance and oxidation resistance at high temperatures can be secured.

(c) La: 0.005–0.3%, Ce: 0.005–0.3%, Nd: 0.005–0.3% and Y: 0.005–0.3%.

BEST MODES FOR CARRYING OUT THE INVENTION

The present inventors made various investigations in search of metallic materials having good resistance to the corrosion phenomenon called metal dusting which occurs at relatively low temperatures.

The occurrence of metal dusting is conditioned by the protective ability of an oxide film formed on the surface and the formation of a carburizing layer formed under that oxide film. Thus, it is presumable that when a crack is formed in the oxide film or the oxide film is peeled off, C penetrates into the metal and forms a carburizing layer and the volume change and the carbide formation/decomposition cause metal dusting. Therefore, investigations were made concerning metallic material compositions suited for increasing the protective ability of oxide films and inhibiting the carburizing layer growth.

In order to increase the protective ability of oxide films, it is most effective to increase the Cr content and, furthermore, it is advisable that an element or elements, such as Si and Al, having high affinity for oxygen, be contained in the metallic material. This is the same as the general technique for increasing the resistance to oxidation.

The penetration of C into metallic materials can be prevented, to a considerable extent, by the above measure. However, it is impossible to realize complete prevention of the penetration of C or, in other words, complete prevention of the cracking or peeling of oxide films over a long period of time. Therefore, in order to increase the metal dusting resistance, it is essential to not only interrupt the penetration of C by means of oxide films, but also inhibit the carburizing layer growth.

Therefore, effects of various additional elements to a base alloy, comprising 25% of Cr and about 60% of Ni with the balance mainly being Fe, which is a fundamental material for high-temperature use, on the carburizing layer growth were examined. As a result, it was revealed that an element supposedly having little affinity for carbon, such as Si, Al or Ni, on one hand, and an element capable of forming a stable carbide in a metallic material, such as Ti, Nb, V or Mo, on the other, has an effect to suppress the rate of carburizing layer growth.

Such a reaction as $$C+CO_2=2CO \qquad (3)$$

proceeds from the right side (2CO) to the left side ($C+CO_2$) on the metal surface, under a certain atmosphere. The C thus formed is adsorbed on the metallic material surface and penetrates into the metallic material, whereby a carburizing layer is formed.

When a carbide-forming element exists, it is supposed that the invading C is bound to such element to prevent the diffusion of C and prevent the carburizing layer growth. However, the reason why Si, Al, Ni and the like can prevent the carburizing layer growth is not so clear.

Further studies revealed that there are some elements, which are not carbide-forming elements, capable of preventing the carburizing layer growth. Therefore, for these elements, their interaction with C was studied from the viewpoint of a solute element in Fe and it was found that those elements all showed a positive value in the interaction coefficient $\Omega$.

When the $\Omega$ is positive, the element in question is effective in increasing the activity of the solute element C. Thus, it is considered that the increased activity of C in a metallic material results in a decrease in the amount of the solute C and thus in a decrease in the flux to the inside, hence in growth retardation.

Those elements which show a positive $\Omega$ value were studied. P and S, for instance, show a large positive $\Omega$ value but deteriorate such properties as hot workability and toughness of metallic materials, so that their content must be reduced. As for Ag and As, which also show a high $\Omega$ value, it is difficult to use Ag from the cost viewpoint, and As from the toxicity viewpoint.

Among the elements showing a positive $\Omega$ value, Co and Cu are in general used as additive elements in steel. Therefore, the effects of their addition were examined and it was found that they are effective in improving the metal dusting resistance. It was further found that N can also be utilized in improving the metal dusting resistance, although it is difficult to use it at a high content level.

For each of the above-mentioned elements Si, Al, Ni, Co, Cu and N, the relation between the content and the carburizing layer growth inhibiting effect was investigated using test melted materials. The results were subjected to multiple regression calculations, and the carburizing layer growth inhibiting effects and, therefore, the influence of the respective elements on the metal dusting resistance could be made clear.

Since those elements capable of forming stable carbides in metallic materials, such as Ti, Nb, V and Mo, also have a carburizing layer growth inhibiting action, the influences of their contents were then studied. As a result, it was found that the carburizing layer growth inhibiting effect of each of the above-mentioned elements capable of forming stable carbides in metallic materials is almost proportional to the atom concentration and, that when the Mo and W contents are each expressed in terms of 1/2 of the atom concentration and the contents of other elements in terms of the respective atom concentration, the sum of the concentrations can be used as an index quantitatively explaining the above effect. This indicates that these elements bind to the intruding carbon from the surface to form stable carbides, as mentioned above, and thereby prevent the carburizing layer growth.

It was thus found that the metal dusting resistance of high Cr-high Ni-Fe alloys can be markedly improved, by preventing C from intruding into the metal materials by including an element capable of strengthening the oxide film formed on the surface, and, by inhibiting the carburizing layer growth in a carburizing atmosphere by containing at least one of elements showing a positive interaction coefficient $\Omega$ together with an appropriate amount of a carbide-forming element.

However, the addition of the above elements may produce an adverse effect, according to their addition levels, on the hot workability and/or high-temperature corrosion resistance. For preventing such an adverse effect, it is advantageous to add the following elements to the metallic materials.

That is, B, Ca and Mg, at low content levels, can inhibit cracking during the hot working of the metallic material in question and thus improve the hot workability. These elements presumably have a positive effect by strengthening the steel grain boundaries and/or changing the morphology of trace inclusions.

Rare earth elements, such as La, Ce, Nd and Y, when contained in small amounts in the metallic material, can improve the high temperature corrosion resistance and oxidation resistance. This is probably due to the promotion, by those elements, of uniform oxide film formed by Cr, Al and Si and, further, to the strengthening thereby of the adhesion between the oxide films and metallic material interface.

When the metallic material contains high content levels of Si and Al, which markedly increasing the metal dusting resistance, due to two reasons, first the effect of increasing the protective ability of oxide films formed on the surface and, secondly, the effect of preventing the carburizing layer growth due to the interaction coefficient $\Omega$ is positive. But, the high contents of Si and Al deteriorate the hot workability and the weldability remarkably.

As a result of investigations made by the present inventors, however, it was found that the deterioration in hot workability and weldability, resulting from the high contents of Si and Al, could be alleviated by simultaneously reducing the contents of P, S and N in the metallic material.

That is, in the case of metallic materials poor in hot workability and weldability, the grain boundary bonding is weak and the relative difference between the intragranular strength, resulting from the strengthened grain inside and the grain boundary strength is large, so that cracks starting from grain boundaries occur frequently in the step of hot working or welding. Therefore, for preventing grain boundary cracking in the step of hot working or welding, it is effective to restrict the contents of P and S, which segregate along grain boundaries and weaken the bonding force and, at the same time, restrict the content of N, which causes precipitation of nitrides within the grains.

The above-mentioned elements P, S and N increase the interaction coefficient $\Omega$ and improve the metal dusting resistance. However, the metal dusting resistance can be markedly improved by elevating the contents of Si and Al compared with the addition of P, S and N. Therefore, when a high level of metal dusting resistance is required, it is recommended that Si and Al be contained at elevated levels and the resulting deterioration in hot workability or weldability be suppressed by restricting the contents of P, S and N.

The present invention has been completed based on the findings mentioned above.

In the following, the grounds for the restrictions of the composition of the metallic material of the present invention are described in detail. The content of each element given in is on the basis of "% by mass".

Cr:

Cr is a fundamental component of the metallic material, according to the present invention, which is to be used at high temperatures. In a high-temperature environment, Cr is effective in retarding the carburizing layer growth as a result of its binding to C that has penetrated into the metallic material. Thereby, good metal dusting resistance can be secured. In order to produce this effect, it is necessary that the content of Cr be at least 10%. On the other hand, if the Cr content exceeds 35%, the toughness decreases and the hot workability deteriorates, making its working difficult. Therefore, the Cr content should be 10–35%. Better metal dusting resistance can be obtained at a Cr content of not less than 15%. A more preferable content of Cr is 18–33%, and a content of 25.2–33% is most preferable.

Ni:

Ni is also a fundamental component of the metallic material of the present invention and is effective in maintaining the strength and the micro-structural stability at elevated temperatures and also in increasing the corrosion resistance in synergy with Cr. Ni is also effective in preventing the occurrence of metal dusting. These effects are produced at Ni contents of not less than 30% and the effects become more and more significant as the content increases until 78%. Therefore, the Ni content should be 30–78%. More preferably, the Ni content is 48–78%, still more preferably 50–78%, most preferably 56–78%.

C:

C need not always be added. C, if added, has an effect of increasing the strength of the metallic material. To reliably obtain this effect, the C content should be, desirably, not less than 0.01%. However, if the C content exceeds 0.2%, the hot workability and the weldability of the metallic material deteriorate. Therefore, the C content should be not more than 0.2%. In cases where C is added, the content of C is preferably 0.01–0.18%, more preferably 0.02–0.15%.

Si:

Si has a deoxidizing effect in the step of melting the metallic material. In addition, Si forms a Si oxide film under the Cr oxide film on the metallic material surface and thereby prevents C from intruding into the metal and, at the same time, increases the activity of C in the metallic material which markedly improves the metal dusting resistance. For obtaining these effects, the Si content is required to be not less than 0.01%. However, the addition of Si in excessive amounts causes deterioration in the hot workability and the weldability. In particular when its content exceeds 4%, the deterioration in the hot workability and weldability becomes significant. Therefore, the lower limit of the Si content is set at 0.01%, and the upper limit at 4%. More preferably, the upper and lower limits of the Si content are set at 0.05% and 3.5%, respectively, most preferably at 0.1% and 3.2%, respectively.

In cases where, as explained later, the N content exceeds 0.055% and/or the contents of P and S as impurities are allowed to increase up to 0.04% and 0.015%, respectively, it is recommended that the upper limit of the Si content be set at 2% and, the upper limit of the Al content be set at 2%.

When the upper limit of the content of N, to be explained later, is set at 0.055% and the upper limits of the contents of P and S are set at 0.03% and 0.01%, respectively, good hot workability and weldability can be secured and, therefore, in this case, the Si content may be 1.1% or more in order to markedly increase the metal dusting resistance. In this case, it is more preferable that the upper limit of the Al content be set at 0.5% to obtain better hot workability and weldability.

Mn:

Mn is an element necessary for suppressing the hot working brittleness due to the S contained as an impurity and, in order to obtain such an effect, Mn is to be contained at least 0.05%. However, Mn is an element facilitating the occurrence of metal dusting by decreasing the activity of C in the metallic material and inhibiting the formation of a oxide film of Cr and Al on the metallic material surface and thereby promoting the penetration of C from the atmosphere and, therefore, its content must be 2% at most. Preferably, the Mn content is 0.05–1.0%, more preferably 0.1–0.8%.

P:

P is an impurity element coming from a raw material(s) in the step of metallic material melting. It causes a decrease in corrosion resistance and deteriorates the hot workability and the weldability. Therefore, it is desirable to reduce its content as far as possible. In the present invention, its allowable content is up to 0.04%. A more preferable P content is not more than 0.03% and a still more preferable P content is not more than 0.025%. A P content of not more than 0.02% is most preferable.

S:

S is also an impurity element coming from a raw material (s) in the step of metallic material melting. It causes a decrease in corrosion resistance and deteriorates the hot workability and the weldability. Therefore, it is desirable to reduce its content as far as possible. In the present invention, its allowable content is up to 0.015%. A more preferable S content is not more than 0.01% and a still more preferable S content is not more than 0.007%. A S content of not more than 0.002% is most preferable.

Al:

Al has a deoxidizing effect in the step of melting the metallic material. Al is also effective in markedly improving the metal dusting resistance, by forming an Al oxide film under the Cr oxide film on the metallic material surface, or by forming an Al oxide film on the uppermost surface of the metallic material, and thereby preventing C from penetrating into the metallic material and, at the same time, increasing the activity of C in the metallic material. In order to produce these effects, the Al content is required to be not less than 0.005%. However, the addition of Al in large amounts causes deterioration in the hot workability and the weldability. In particular when its content is 4.5% or more, the hot workability and the weldability deteriorate markedly. Therefore, the lower limit of the Al content is set at 0.005% while the upper limit should be less than 4.5%. More preferably, the upper limit of the Al content is set at a level less than 4% Most preferably, the lower limit of the Al content is set at 0.01% while the upper limit is less than 3.7%.

In cases where, as explained later, the N content exceeds 0.055% and/or the contents of P and S as impurities are allowed to increase up to 0.04% and 0.015%, respectively, it is recommended that the upper limit of the Al content be set at 2% and, at the same time, the upper limit of the Si content be set at 2%.

When the upper limit of the content of N, to be explained later, is set at 0.055% and the upper limits of the contents of P and S are set at 0.03% and 0.01%, respectively, good hot workability and weldability can be secured and, therefore, in this case, the Al content may be 2.6% or more in order to markedly increase the metal dusting resistance. In this case, it is more preferable that the upper limit of the Si content be set at 0.5% to obtain better hot workability and weldability.

N:

N is effective in increasing the activity of C in the metallic material and thereby improves the metal dusting resistance. However, at a N content of less than 0.001%, such effects cannot be produced to a satisfactory extent. On the other hand, if the N content exceeds 0.2%, the nitrides of Cr and Al are produced in large amounts, whereby the hot workability and the weldability markedly deteriorate. Therefore, the lower limit of the N content is set at 0.001%, and the upper limit at 0.2%.

When the upper limits of the Si and Al contents are each set at 2%, it is recommended that the lower limit of the N content be set at 0.005%. In this case, the upper limit of the N content is more preferably set at 0.15%.

On the other hand, where the contents of the Si and Al are each increased to over 2% and up to 4% for Si and up to a level less than 4.5% for Al in order to further increase the metal dusting resistance, the upper limit of the N content is preferably set at 0.055% from the viewpoint of weldability and hot workability. More preferably, the upper limit of the N content is set at 0.035% and most preferably at 0.025%.

Cu and Co:

Cu and Co are very important elements in the practice of the present invention. Both of these elements increase the activity of C in the metallic material and, as a result, inhibit the carburizing layer growth and improve the metal dusting resistance. The above effects can be obtained if the contents of each of Cu and Co are not less than 0.015%. However, the addition of Cu and Co in large amounts causes decreases in the toughness and the hot workability and, in particular when the content of these two elements exceeds 3%, the decreases in the toughness and the hot workability become remarkable. Therefore, the contents of Cu and Co each should be 0.015–3%. For each of Cu and Co, a preferable content is 0.02–1.8%, and a more preferable content is 0.05–1.8%. The metallic material may contain one or both of Cu and Co.

fn1:

As mentioned above, the present inventors investigated the relationship between the content of each of the elements Si, Al, Ni, Co, Cu and N, which increase the activity of C in the metallic material, and also the carburizing layer growth inhibiting effect thereof, using test melted materials.

As a result, it was revealed that the carburizing layer growth inhibiting effect, hence the effect of the content of each element on the metal dusting resistance, can be represented or regulated by the value of fn1 according to the formula (1) given above. As the value of fn1 increases, the metal dusting resistance, namely the inhibitory effect on the occurrence of metal dusting, increases and particularly when the value of fn1 is 50 or more, very good metal dusting resistance can be realized. Therefore, the value of fn1 represented by the above formula (1) should be not less than 50. In order to obtain an even more significant effect, it is recommended that the value of fn1 be kept at not less than 60. The value of fn1 is more preferably not less than 70 and still more preferably not less than 80.

When the Si content is 1.1–4% and the value of fn1 is not less than 95, or when the Al content is not less than 2.6% but less than 4.5% and the value of fn1 is not less than 70, very good metal dusting resistance can be obtained. When the Si content is 1.1–4% and the value of fn1 is not less than 110, or when the Al content is not less than 2.6% but less than 4.5% and the value of fn1 is not less than 90, still better metal dusting resistance can be obtained.

The metallic material, according to the present invention, is required only to contain the above-mentioned elements from Cr to N, and either Cu or Co or both of these elements excluding Fe. However, it may contain, in addition to the above components, one or more of the above-mentioned (a) to (c) group elements selectively, according to their need. Namely, one or more of the above-mentioned (a) to (c) group elements may be added as optional additive elements to be included in the metallic material.

In the following, the above optional additive elements are described.

Mo, Ta, W, Ti, V, Zr, Nb and Hf: (a) group

These elements are all carbide-forming elements and, when added, they inhibit the carburizing layer growth and effectively increase the metal dusting resistance. Each of the above elements is also effective in increasing the strength at elevated temperatures.

For securing the effects mentioned above, the contents of Mo, Ta and W are each preferably not less than 0.05% and the contents of Ti, V, Zr, Nb and Hf are each preferably not less than 0.01%. However, a Mo content exceeding 10%, a Ta or W content exceeding 5%, a Ti, Zr or Nb content exceeding 3%, or a V or Hf content exceeding 1% will cause a marked decrease in hot workability, toughness and weldability.

Therefore, when Mo, Ta, W, Ti, V, Zr, Nb and/or Hf are added, it is recommended that the respective contents be as follows: Mo: 0.05–10%, Ta: 0.05–5%, W: 0.05–5%, Ti: 0.01–3%, V: 0.01–1%, Zr: 0.01–3%, Nb: 0.01–3% and Hf: 0.01–1%. When they are added, the preferable ranges of their contents are: Mo: 1–10%, Ta and W: each 0.5–5%, Ti, Zr and Nb: each 0.01–1.4%, and V and Hf: each 0.01–0.6%. When they are added, the more preferable ranges of their contents are: Mo: 1.5–9%, Ta and W: each 1–3%, Ti: 0.01–0.4%, Zr and Nb: each 0.02–0.8%, V: 0.01–0.3%, and Hf: 0.02–0.6%.

When the upper limit of the N content is set at 0.2%, the upper limit of the Mo content is preferably set at 5%.

Only one or a combination of two or more of the above-mentioned elements Mo, Ta, W, Ti, V, Zr, Nb and Hf may be added.

fn2:

As already mentioned, the present inventors made investigations concerning the relationship between the content of an element capable of forming a stable carbide in the metallic material and its carburizing layer growth inhibiting effect.

As a result, it was found that the carburizing layer growth inhibiting effect of each of Mo, Ta, W, Ti, V, Zr, Nb and Hf, which can form stable carbides in the metallic material, is almost proportional to the atom concentration thereof and, when the Mo and W contents are each expressed in terms of 1/2 of the atom concentration, and the contents of other elements in terms of the respective atom concentrations, and the sum of the concentrations is taken as an index, the carburizing layer growth inhibiting effect, hence the metal dusting resistance, can be expressed by that index, namely the fn2 value described by the formula (2) given hereinabove.

As the value of fn2 increases, the metal dusting resistance, namely the inhibitory effect on the occurrence of metal dusting increases and, when the value of fn2 is not less than 0.003, in particular, good metal dusting resistance can be obtained. Therefore, the fn2 value defined by the above formula (2) should preferably be not less than 0.003, more preferably not less than 0.005, still more preferably not less than 0.007.

B, Ca and Mg: (b) Group

These elements, when added, each show a hot workability improving effect. In order to obtain this effect without fail, it is preferable that the content of each be not less than 0.0005%. However, when the B content exceeds 0.02%, the metallic material becomes brittle and its melting point lowers, causing deteriorate in the hot workability and the weldability. Ca and Mg, each at a content exceeding 0.02%, form oxide type inclusions, thus deteriorating the product surface quality and decreasing the corrosion resistance. Therefore, when B, Ca and/or Mg are added, the content of each is desirably 0.0005–0.02%. For each of the elements, a preferable content range is 0.0005–0.015%, a more preferable range is 0.0005–0.012%. These elements may be added either singly or in combination of two or more.

La, Ce, Nd and Y: (c) Group

When added, these elements all are effective in improving the uniformity and adhesion of Cr- and/or Al-containing oxide films formed on the metallic material surface in the use environment and thereby improving the corrosion resistance. In order to produce this effect without fail, the content of each should preferably be not less than 0.005%. However, when the content exceeds 0.3%, each element forms a coarse oxide and causes a decrease in the toughness and the hot workability and, further, allows the occurrence of an increased number of surface flaws. Therefore, when La, Ce, Nd and/or Y are added, the content of each is desirably 0.005–0.3%. For each of the elements, a preferable content range is 0.005–0.1%, and a more preferable range is 0.005–0.07%. These elements may be added either singly or in combination of two or more.

Fe:

Fe is an element which constitutes the substantial balance in the metallic material of the present invention. However, Fe lowers the denseness of Cr, Al and Si oxide films formed on the surface of the metallic material. When these oxide films formed on the metallic material surface are dense and excellent in adhesion to the metallic material, their barrier effect against the penetration of C into the metallic material is substantial and, in that case, good metal dusting resistance can be obtained. Therefore, it is recommended that the content of Fe, which lowers the denseness of the oxide films mentioned above, be reduced. It is not necessary, however, to reduce the Fe content to 0%, since an excessive reduction in Fe content causes an increase in cost. In this case, when the Fe content is not more than 10%, its adverse influence on the barrier effect of the above oxide films against the penetration of C into the metallic material is slight. It is therefore recommended that the Fe content be reduced to 10% or less. More preferably, the upper limit of the Fe content is 9% and still more preferably 8%.

In the metallic material for which the lower limits of the Cr and Ni contents are set at 15% and 48%, respectively, and the upper limits of the P, S and N contents are set at 0.03%, 0.01% and 0.055%, respectively, improved metal dusting resistance can be obtained when the Si content is 1.1–4% and the fn1 value is not less than 95. Furthermore, when, in addition to the above Si content and fn1 value requirements, if the Al content is 0.005–0.5%, more improved hot workability and weldability can be obtained.

In the metallic material for which the lower limits of the Cr and Ni contents are set at 15% and 48%, respectively, and the upper limits of the P, S and N contents are set at 0.03%, 0.01% and 0.055%, respectively, improved metal dusting resistance can be obtained when the Al content is not less than 2.6% but less than 4.5% and the fn1 value is not less than 70. Furthermore, when, in addition to the above Al content and fn1 value requirements, if the Si content is 0.01–0.5%, more improved hot workability and weldability can be obtained.

In each of the above cases, very good metal dusting resistance can be obtained when the Fe content is reduced to 10% or less.

The metallic material having the chemical composition mentioned above is excellent in metal dusting resistance, in particular in an atmosphere at 1,000° C. or below in which the total content of hydrocarbons, CO and $H_2$ is not less than 25% by volume and the total content of hydrocarbons and CO is not less than 1% by volume. Therefore, when this metallic material is applied in manufacturing reforming tubes, peripheral equipment and other parts for use in heat exchanger type reforming units for hydrocarbon or waste heat recovery systems in petrochemical plants, the durability and safety of the unit and equipment can be markedly improved. Therefore, this metallic material is suited for the manufacture of parts exposed to the above-mentioned atmosphere.

The above metallic material can be molded or formed into desired shapes, such as seamless tubes, welded tubes, plates and bars, by an ordinary production process applied to steel and other metallic materials, for example by melting, forging, hot working, cold working, welding, etc. It may also be formed into desired shapes by powder metallurgy, centrifugal casting or the like technology.

After forming, the shaped articles may be subjected to homogenization heat treatment (solution heat treatment) which comprises heating at 1,050–1,250° C., for instance. Furthermore, after forming or after further homogenization heat treatment, the metallic material surface may be subjected to pickling, shot blasting, grinder polishing, electrolytic polishing and/or other surface treatment.

The above metallic material exhibits excellent resistance in a atmosphere in which metal dusting readily occurs and, therefore, it may be used either alone or in the form of a double- or multi-layer metallic material comprised of two or more layers.

In using it in the form of a double- or multi-layer metallic material, it is necessary that only the metallic material of the present invention be faced to the atmosphere which causes metal dusting. Therefore, it is only necessary that at least one of the outermost layers be constituted of the metallic material of the present invention. In this case, the support members (strength members) may be constituted of one of carbon steel, stainless steel, Ni-based alloys, Co-based alloys and the like or of a combination of all of these contents.

The method of producing the above double- or multi-layer metallic material is not particularly restricted but a desired shaped may be formed, for example, by joining by ordinary cladding or welding, followed by hot working or cold working.

That layer of the double- or multi-layer metallic material which is in contact with an atmosphere possibly causing metal dusting may be produced by overlaying, chemical vapor deposition (CVD), physical vapor deposition (PVD), plating or a like surface treatment. When the layer resulting from the above surface treatment has a chemical composition within the range mentioned above, the metal dusting resistance can be increased.

Summing up the foregoing, typical embodiments of the present invention concerning the metallic material and double- or multi-layer metallic material and of the invention directed to "tubes/pipes" in regards to the shape after forming, are given below under (1) to (16).

(1) A metallic material having metal dusting resistance which comprises, in mass %, C: not more than 0.2%, Si: 0.01–2%, Mn: 0.05–2%, P: not more than 0.04%, S: not more than 0.015%, Cr: 10–35%, Ni: 30–78%, Al: 0.005–2%, N: 0.005–0.2%, and one or both of Cu: 0.015–3% and Co: 0.015–3%, with the balance substantially being Fe, and of which the fn1 value defined by the formula (1) given hereinabove is not less than 50.

(2) A metallic material having metal dusting resistance which comprises, in mass %, C: not more than 0.2%, Si: 0.01–2%, Mn: 0.05–2%, P: not more than 0.04%, S: not more than 0.015%, Cr: 10–35%, Ni: 30–78%, Al: 0.005–2%, N: 0.005–0.2%, and one or both of Cu: 0.015–3% and Co: 0.015–3% and further comprises at least one of the (a-1) group elements specified below, with the balance substantially being Fe, and of which the fn1 value defined by the formula (1) given hereinabove is not less than 50:

Mo: 0.05–5%, Ta: 0.05–5%, W: 0.05–5%, Ti: 0.01–3%, V: 0.01–1%, Zr: 0.01–3%, Nb: 0.01–3% and Hf: 0.01–1%. (a-1)

(3) A metallic material having metal dusting resistance which comprises, in mass %, C: not more than 0.2%, Si: 0.01–2%, Mn: 0.05–2%, P: not more than 0.04%, S: not more than 0.015%, Cr: 10–35%, Ni: 30–78%, Al: 0.005–2%, N: 0.005–0.2%, and one ore both of Cu: 0.015–3% and Co: 0.015–3% and further comprises at least one of the (a-1) group elements specified above, with the balance substantially being Fe, and of which the fn1 value defined by the formula (1) given hereinabove is not less than 50 and the fn2 value defined by the formula (2) given hereinabove is not less than 0.003.

(4) The metallic material having metal dusting resistance according to any of (1) to (3), which further comprises at least one of the (b) group elements specified hereinabove in lieu of part of Fe.

(5) The metallic material having metal dusting resistance according to any of (1) to (4), which further comprises at least one of the (c) group elements specified hereinabove in lieu of part of Fe.

(6) The metallic material having metal dusting resistance according to any of (1) to (5), which is intended for use in an atmosphere at 1,000° C. or below in which the total content of hydrocarbons, CO and $H_2$ is not less than 25% by volume and the total content of hydrocarbons and CO is not less than 1% by volume.

(7) A metallic material having metal dusting resistance which comprises, in mass %, C: not more than 0.2%, Si: 0.01–4%, Mn: 0.05–2%, P: not more than 0.03%, S: not more than 0.01%, Cr: 15–35%, Ni: 48–78%, Al: not less than 0.005% but less than 4.5%, N: 0.001–0.055%, and one or both of Cu: 0.015–3% and Co: 0.015–3%, with the balance substantially being Fe, and of which the fn1 value defined by the formula (1) given hereinabove is not less than 60.

(8) A metallic material having metal dusting resistance which comprises, in mass %, C: not more than 0.2%, Si: 0.01–4%, Mn: 0.05–2%, P: not more than 0.03%, S: not more than 0.01%, Cr: 15–35%, Ni: 48–78%, Al: not less than 0.005% but less than 4.5%, N: 0.001–0.055%, and one or both of Cu: 0.015–3% and Co: 0.015–3% and further comprises at least one of the (a-2) group elements specified below, with the balance substantially being Fe, and of which the fn1 value defined by the formula (1) given hereinabove is not less than 60:

Mo: 0.05–10%, Ta: 0.05–5%, W: 0.05–5%, Ti: 0.01–1.4%, V: 0.01–1%, Zr: 0.01–1.4%, Nb: 0.01–1.4% and Hf: 0.01–1%(a-2)

(9) A metallic material having metal dusting resistance which comprises, in mass %, C: not more than 0.2%, Si: 0.01–4%, Mn: 0.05–2%, P: not more than 0.03%, S: not more than 0.01%, Cr: 15–35%, Ni: 48–78%, Al: not less than 0.005% but less than 4.5%, N: 0.001–0.055%, and one or both of Cu: 0.015–3% and Co: 0.015–3% and further comprises at least one of the above-mentioned (a-2) group elements, with the balance substantially being Fe, and of which the fn1 value defined by the formula (1) given hereinabove is not less than 60 and the fn2 value defined by the formula (2) given hereinabove is not less than 0.003.

(10) The metallic material having metal dusting resistance according to any of (7) to (9), which further comprises at least one of the (b) group elements specified hereinabove in lieu of part of Fe.

(11) The metallic material having metal dusting resistance according to any of (7) to (10), which further comprises at least one of the (c) group elements specified hereinabove in lieu of part of Fe.

(12) The metallic material having metal dusting resistance according to any of (1) to (5) or any of (7) to (11) wherein the content of Fe is over 0% but not more than 10%.

(13) The metallic material having metal dusting resistance according to any of (7) to (12), which is intended for use in an atmosphere at 1,000° C. or below in which the total content of hydrocarbons, CO and $H_2$ is not less than 25% by volume and the total content of hydrocarbons and CO is not less than 1% by volume.

(14) A double- or multi-layer metallic material comprising one layer or a plurality of layers made of the metallic material having metal dusting resistance as described above under any of (1) to (5) or any of (7) to (12), with at least one of the outermost layers being a layer of the above-mentioned metallic material having metal dusting resistance.

(15) A metal tube or pipe of which the material is the metallic material having metal dusting resistance as described above under any of (1) to (5) or any of (7) to (12).

(16) A double- or multi-layer metal tube or pipe of which the material is the double- or multi-layer metallic material as described above under (14), with the outer surface being a layer of the metallic material having metal dusting resistance.

EXAMPLES

The following examples illustrate the present invention in more detail. These examples are, however, by no means limitative of the scope of the present invention.

Example 1

Metallic materials having the respective chemical compositions shown in Table 1 and Table 2 were melted in a high-frequency vacuum furnace, followed by forging, hot working and cold working in the conventional manner, to give 6-mm-thick plates. They were subjected to solution heat treatment at 1,150° C., and test specimens, 4 mm thick, 10 mm wide and 20 mm long, were prepared.

TABLE 1

| Test No. | Chemical composition (% by mass) (The balance: Fe and impurities) | | | | | | | | | | | | | |
|---|---|---|---|---|---|---|---|---|---|---|---|---|---|---|
| | C | Si | Mn | P | S | Cr | Ni | Cu | Co | Al | N | Others | fn1 | fn2 |
| 1 | 0.05 | 0.55 | 0.34 | 0.024 | 0.0075 | 13.4 | 39.6 | 0.018 | — | 0.019 | 0.007 | — | 62.16 | 0 |
| 2 | 0.09 | 0.02 | 0.54 | 0.011 | 0.0121 | 16.5 | 42.2 | 0.35 | 0.35 | 0.055 | 0.010 | — | 50.68 | 0 |
| 3 | 0.03 | 0.04 | 0.55 | 0.008 | 0.0085 | 15.5 | 73.4 | 0.88 | — | 1.75 | 0.050 | — | 94.55 | 0 |
| 4 | 0.03 | 0.08 | 0.78 | 0.012 | 0.0012 | 18.9 | 65.0 | 1.32 | 0.59 | 0.035 | 0.010 | — | 87.88 | 0 |
| 5 | 0.04 | 0.15 | 0.06 | 0.015 | 0.0002 | 33.5 | 66.4 | 2.87 | — | 0.041 | 0.010 | — | 101.71 | 0 |
| 6 | 0.05 | 0.34 | 0.24 | 0.011 | 0.0016 | 14.6 | 64.3 | — | 1.22 | 0.010 | 0.020 | — | 90.95 | 0 |
| 7 | 0.07 | 0.54 | 1.88 | 0.023 | 0.0048 | 19.6 | 55.9 | 0.52 | 2.65 | 0.014 | 0.030 | Mo: 1.5, La: 0.05, Nd: 0.01 | 110.47 | 0.0078 |
| 8 | 0.10 | 0.98 | 0.39 | 0.028 | 0.0044 | 20.2 | 45.9 | 0.34 | — | 0.008 | 0.130 | Mo: 3.2 | 93.74 | 0.0167 |
| 9 | 0.05 | 0.08 | 0.78 | 0.008 | 0.0002 | 24.5 | 72.1 | — | 0.88 | 0.018 | 0.010 | V: 0.3, Zr: 0.7 | 84.59 | 0.0135 |
| 10 | 0.13 | 0.19 | 0.54 | 0.010 | 0.0002 | 11.2 | 73.6 | — | 0.64 | 0.035 | 0.010 | W: 1.1, B: 0.004, Nd: 0.01 | 88.18 | 0.0030 |
| 11 | 0.06 | 0.45 | 0.65 | 0.021 | 0.0055 | 21.2 | 32.1 | 0.025 | — | 0.078 | 0.070 | Mo: 1.2 | 53.54 | 0.0063 |
| 12 | 0.08 | 1.79 | 0.79 | 0.014 | 0.0033 | 25.5 | 38.1 | 1.1 | — | 0.047 | 0.010 | Ti: 0.5, V: 0.03 | 121.34 | 0.011 |
| 13 | 0.04 | 0.37 | 0.60 | 0.018 | 0.0007 | 24.5 | 35.1 | 0.25 | — | 0.052 | 0.010 | Ta: 0.8 | 53.06 | 0.0044 |
| 14 | 0.18 | 0.27 | 0.85 | 0.029 | 0.0010 | 28.3 | 43.5 | — | 0.14 | 0.95 | 0.010 | B: 0.003 | 60.75 | 0 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)

TABLE 2

| Test No. | C | Si | Mn | P | S | Cr | Ni | Cu | Co | Al | N | Others | fn1 | fn2 |
|---|---|---|---|---|---|---|---|---|---|---|---|---|---|---|
| 15 | 0.08 | 0.29 | 0.52 | 0.037 | 0.0001 | 23.1 | 74.4 | 0.33 | — | 1.55 | 0.040 | Zr: 1.2, Ca: 0.003 | 98.65 | 0.013 |
| 16 | 0.05 | 0.75 | 0.96 | 0.011 | 0.0045 | 25.9 | 45.2 | 0.019 | — | | 0.051 | Ti: 1.2, La: 0.03 | 82.85 | 0.025 |
| 17 | 0.06 | 1.24 | 0.15 | 0.009 | 0.0041 | 26.9 | 42.5 | 0.79 | 0.66 | 0.018 | 0.010 | Mo: 0.8, Ta: 0.5, Ca: 0.003 | 107.09 | 0.0055 |
| 18 | 0.09 | 0.77 | 0.60 | 0.017 | 0.0021 | 20.1 | 42.5 | 0.28 | 0.77 | 0.005 | 0.010 | Ce: 0.02 | 84.23 | 0 |
| 19 | 0.03 | 0.28 | 0.46 | 0.024 | 0.0005 | 22.1 | 47.8 | — | 0.019 | 0.120 | 0.050 | Nb: 0.5, Mo: 3.5 | 61.79 | 0.0236 |
| 20 | 0.12 | 0.08 | 0.79 | 0.026 | 0.0015 | 24.8 | 40.0 | — | 1.26 | 0.20 | 0.030 | Hf: 0.15, Mg: 0.0021, Y: 0.01 | 58.00 | 0.0008 |
| 21 | 0.02 | 0.45 | 0.23 | 0.012 | 0.0010 | 15.6 | 25.2 | 0.05 | — | | 0.015 | Mo: 0.1, Nb: 0.2 | 44.18 | 0.0074 |
| 22 | 0.04 | 0.12 | 0.22 | 0.014 | 0.0020 | 14.4 | 32.1 | — | | 0.25 | 0.034 | 0.020 — | 40.37 | 0 |
| 23 | 0.07 | 0.25 | 0.29 | 0.011 | 0.0010 | 17.7 | 42.7 | — | | | 0.098 | 0.030 Ti: 0.2, Mo: 1.5 | 56.39 | 0.012 |
| 24 | 0.05 | 0.55 | 0.45 | 0.009 | 0.0015 | 8.8 | 67.2 | 0.49 | 0.02 | 0.018 | 0.020 | W: 2.0 | 95.19 | 0.0054 |
| 25 | 0.06 | 0.30 | 0.21 | 0.011 | 0.0001 | 16.9 | 35.4 | 0.03 | 0.02 | 0.013 | 0.010 | — | 48.37 | 0 |
| 26 | 0.06 | 0.28 | 1.18 | 0.029 | 0.0018 | 25.8 | 25.3 | 1.9 | — | | 0.015 | 0.030 Ti: 0.45 | 56.78 | 0.0094 |
| 27 | 0.29 | 0.56 | 0.12 | 0.014 | 0.0001 | 23.4 | 36.7 | — | 0.25 | 0.40 | 0.090 | Mo: 1.1, La: 0.03 | 67.20 | 0.0057 |
| 28 | 0.03 | 0.12 | 0.09 | 0.017 | 0.0010 | 26.3 | 31.9 | 0.10 | 0.30 | 0.89 | 0.008 | Ti: 0.3 | 45.47 | 0.0063 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)

The thus-obtained test specimens of each metallic material were subjected to a test which comprised holding them in an atmosphere consisting of 58% $H_2$-40% CO-2% $H_2O$ (by volume) at 600° C. for 4 weeks.

Then, the surface deposit of each test specimen was removed and the specimen was weighed, and the corrosion loss was determined by the difference from the mass before testing. Further, the sectional microstructure of each specimen was observed under an optical microscope and the depth of the carburizing layer was measured.

The metal dusting resistance was evaluated in terms of rate of corrosion loss and carburizing layer growth rate. The investigation results are shown in Table 3.

TABLE 3

| Test No. | Rate of corrosion loss [mg/(cm$^2$·hr)] | Carburizing layer growth rate [μm/hr] |
|---|---|---|
| 1 | 0.00018 | 0.017 |
| 2 | 0.00025 | 0.025 |
| 3 | 0.00009 | 0.009 |
| 4 | 0.00012 | 0.010 |
| 5 | 0.00007 | 0.007 |
| 6 | 0.00008 | 0.011 |
| 7 | 0.00002 | 0.003 |
| 8 | 0.00001 | 0.001 |
| 9 | 0.00003 | 0.002 |
| 10 | 0.00005 | 0.004 |
| 11 | 0.00005 | 0.005 |
| 12 | 0.00001 | 0 |
| 13 | 0.00009 | 0.008 |
| 14 | 0.00015 | 0.015 |
| 15 | 0.00001 | 0 |
| 16 | 0.00002 | 0.001 |
| 17 | 0.00004 | 0.002 |
| 18 | 0.00011 | 0.011 |
| 19 | 0.00001 | 0.002 |
| 20 | 0.00002 | 0.005 |
| 21 | 0.00191 | 0.127 |
| 22 | 0.00295 | 0.198 |
| 23 | 0.00075 | 0.035 |
| 24 | 0.00173 | 0.134 |
| 25 | 0.00085 | 0.068 |
| 26 | 0.00122 | 0.089 |
| 27 | 0.00081 | 0.052 |
| 28 | 0.00158 | 0.082 |

From Table 3, it is evident that the metallic materials given test numbers 1 to 20 and satisfied with the chemical composition requirements specified herein are low in rate of corrosion loss and also slow in carburizing layer growth rate and thus are excellent in metal dusting resistance. On the contrary, the metallic materials given test number 21 to 28, which are failing to meet the chemical composition requirements specified herein, are poor in metal dusting resistance.

Example 2

The metallic materials having the respective chemical compositions shown in Tables 4–11 were melted using a high-frequency vacuum furnace.

TABLE 4

| Test No. | C | Si | Mn | P | S | Cr | Ni | Cu | Co | Al | N | La | Ce | Nd | Y |
|---|---|---|---|---|---|---|---|---|---|---|---|---|---|---|---|
| 29 | 0.08 | 1.45 | 0.78 | 0.028 | 0.0070 | 23.5 | 50.5 | 0.25 | — | 0.78 | 0.008 | — | — | — | — |
| 30 | 0.05 | 0.68 | 0.66 | 0.005 | 0.0090 | 28.8 | 58.5 | 1.35 | — | 1.55 | 0.003 | — | 0.018 | — | — |
| 31 | 0.06 | 3.54 | 0.77 | 0.015 | 0.0011 | 26.7 | 52.4 | 0.35 | — | 2.10 | 0.003 | — | — | — | — |
| 32 | 0.15 | 1.88 | 0.54 | 0.019 | 0.0012 | 29.5 | 66.4 | 0.25 | — | 0.007 | 0.052 | — | — | — | — |
| 33 | 0.04 | 0.79 | 0.08 | 0.022 | 0.0025 | 33.6 | 56.5 | — | 1.22 | 4.38 | 0.033 | — | — | — | — |
| 34 | 0.05 | 0.04 | 0.24 | 0.029 | 0.0058 | 27.4 | 54.2 | 0.15 | — | 0.56 | 0.024 | 0.038 | — | — | — |
| 35 | 0.07 | 2.47 | 0.08 | 0.018 | 0.0015 | 29.5 | 57.8 | 0.66 | 2.60 | 2.95 | 0.021 | — | — | — | — |

TABLE 4-continued

| Test No. | C | Si | Mn | P | S | Cr | Ni | Cu | Co | Al | N | La | Ce | Nd | Y |
|---|---|---|---|---|---|---|---|---|---|---|---|---|---|---|---|
| 36 | 0.09 | 1.64 | 0.39 | 0.024 | 0.0050 | 15.8 | 62.1 | 0.33 | — | 1.58 | 0.005 | — | — | — | — |
| 37 | 0.05 | 0.99 | 0.22 | 0.015 | 0.0018 | 26.9 | 49.4 | 1.10 | — | 0.88 | 0.015 | — | — | — | — |
| 38 | 0.12 | 1.25 | 0.35 | 0.009 | 0.0006 | 26.5 | 52.5 | 1.55 | — | 2.11 | 0.015 | — | — | — | 0.12 |
| 39 | 0.15 | 1.77 | 0.04 | 0.016 | 0.0022 | 28.1 | 63.5 | 0.25 | 0.44 | 1.10 | 0.012 | — | — | — | — |
| 40 | 0.12 | 1.48 | 0.12 | 0.022 | 0.0025 | 29.8 | 60.1 | — | 0.06 | 0.57 | 0.018 | — | — | — | — |
| 41 | 0.16 | 2.42 | 0.35 | 0.022 | 0.0035 | 31.5 | 57.2 | — | 0.03 | 0.88 | 0.019 | — | — | — | — |
| 42 | 0.08 | 3.11 | 0.55 | 0.025 | 0.0004 | 27.0 | 66.2 | 0.03 | — | 2.11 | 0.012 | — | 0.042 | — | — |
| 43 | 0.02 | 1.55 | 0.54 | 0.029 | 0.0014 | 28.5 | 62.2 | 0.16 | — | 1.58 | 0.015 | — | — | — | — |
| 44 | 0.18 | 1.16 | 0.21 | 0.008 | 0.0012 | 29.1 | 50.4 | 0.03 | — | 0.05 | 0.025 | — | — | — | — |
| 45 | 0.01 | 2.88 | 0.16 | 0.025 | 0.0019 | 27.7 | 58.2 | 0.05 | 0.15 | 0.007 | 0.025 | — | — | 0.021 | — |
| 46 | 0.14 | 1.78 | 0.12 | 0.018 | 0.0033 | 22.3 | 63.5 | 0.15 | — | 0.35 | 0.014 | 0.024 | — | — | — |

TABLE 5

(continued from Table 4)

| Test No. | Mo | Ta | W | Ti | V | Zr | Nb | Hf | B | Ca | Mg | Fe | fn1 | fn2 |
|---|---|---|---|---|---|---|---|---|---|---|---|---|---|---|
| 29 | — | — | — | — | — | — | — | — | — | — | — | 22.6 | 115 | 0 |
| 30 | — | — | — | 0.04 | 0.03 | — | — | — | — | — | 0.0008 | 8.3 | 107 | 0.001 |
| 31 | 6.4 | — | — | — | — | — | — | — | — | — | — | 7.7 | 208 | 0.033 |
| 32 | — | — | — | — | — | 0.25 | — | — | — | — | — | 1.0 | 146 | 0.003 |
| 33 | — | 2.1 | — | — | 0.07 | — | — | 0.02 | — | — | — | 1.1 | 124 | 0.013 |
| 34 | — | — | — | — | — | 0.11 | — | — | 0.0025 | — | — | 17.1 | 61 | 0.001 |
| 35 | — | — | — | — | — | — | — | — | — | — | — | 3.8 | 205 | 0 |
| 36 | — | — | — | 0.15 | — | — | — | — | 0.0022 | — | — | 17.9 | 139 | 0.003 |
| 37 | 5.1 | — | — | — | — | — | — | — | 0.0019 | 0.0011 | — | 15.3 | 105 | 0.027 |
| 38 | — | — | — | — | — | — | — | — | — | 0.0016 | — | 15.5 | 129 | 0 |
| 39 | — | 1.1 | — | — | — | — | — | — | — | — | — | 3.5 | 147 | 0.006 |
| 40 | — | — | — | 0.16 | — | — | — | — | — | 0.0007 | 0.0018 | 7.5 | 123 | 0.003 |
| 41 | — | — | — | 1.08 | — | — | — | — | — | — | — | 6.3 | 159 | 0.023 |
| 42 | — | — | — | — | — | — | — | — | — | — | — | 0.8 | 202 | 0 |
| 43 | 3.5 | — | — | — | — | — | — | — | — | — | — | 1.9 | 134 | 0.018 |
| 44 | — | — | 1.5 | — | — | — | — | — | 0.0033 | — | — | 17.3 | 98 | 0.004 |
| 45 | — | 2.1 | — | — | — | 1.10 | — | — | — | — | — | 7.6 | 176 | 0.024 |
| 46 | — | — | — | — | — | — | 1.20 | — | — | — | — | 10.4 | 139 | 0.013 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)
The values in the Fe column are values rounded off to the first decimal place.

TABLE 6

| Test No. | C | Si | Mn | P | S | Cr | Ni | Cu | Co | Al | N | La | Ce | Nd | Y |
|---|---|---|---|---|---|---|---|---|---|---|---|---|---|---|---|
| 47 | 0.12 | 1.64 | 0.22 | 0.021 | 0.0075 | 25.6 | 65.1 | 0.11 | — | 0.08 | 0.033 | — | — | — | 0.05 |
| 48 | 0.04 | 1.85 | 0.88 | 0.021 | 0.0025 | 29.2 | 62.2 | 0.32 | — | 0.04 | 0.015 | — | — | — | 0.025 |
| 49 | 0.06 | 0.77 | 0.57 | 0.023 | 0.0011 | 17.8 | 73.2 | 0.15 | — | 3.98 | 0.008 | — | — | — | — |
| 50 | 0.08 | 1.59 | 0.44 | 0.023 | 0.0008 | 25.6 | 56.5 | 0.75 | — | 2.64 | 0.009 | — | — | — | — |
| 51 | 0.05 | 0.77 | 0.45 | 0.019 | 0.0004 | 25.8 | 62.8 | — | 0.25 | 2.71 | 0.015 | 0.012 | 0.025 | 0.011 | — |
| 52 | 0.02 | 2.57 | 0.15 | 0.018 | 0.0006 | 27.2 | 65.2 | — | 0.25 | 3.04 | 0.012 | — | — | — | — |
| 53 | 0.02 | 1.12 | 0.19 | 0.024 | 0.0084 | 19.5 | 63.5 | 2.10 | — | 2.97 | 0.011 | — | — | — | — |
| 54 | 0.02 | 0.14 | 0.19 | 0.026 | 0.0055 | 26.2 | 58.8 | 0.88 | 0.88 | 3.77 | 0.010 | — | — | — | — |
| 55 | 0.03 | 0.05 | 0.22 | 0.008 | 0.0001 | 27.3 | 65.1 | 0.45 | 0.03 | 4.42 | 0.016 | — | — | — | — |
| 56 | 0.05 | 0.22 | 0.08 | 0.011 | 0.0001 | 30.1 | 59.5 | 0.05 | 0.02 | 3.05 | 0.011 | — | — | — | — |
| 57 | 0.05 | 0.18 | 0.77 | 0.029 | 0.0015 | 25.5 | 50.2 | 0.22 | — | 3.15 | 0.008 | — | — | — | — |
| 58 | 0.03 | 0.38 | 0.42 | 0.024 | 0.0019 | 25.4 | 62.7 | 0.19 | 0.19 | 3.25 | 0.008 | 0.044 | — | — | — |
| 59 | 0.05 | 1.52 | 0.33 | 0.015 | 0.0013 | 27.9 | 65.2 | 0.15 | 0.01 | 0.88 | 0.0013 | — | — | — | — |
| 60 | 0.06 | 1.67 | 0.21 | 0.015 | 0.0011 | 28.5 | 62.5 | 0.08 | — | 0.011 | 0.0011 | — | — | — | — |
| 61 | 0.05 | 0.88 | 0.22 | 0.016 | 0.0011 | 29.1 | 64.2 | 0.11 | — | 3.05 | 0.0013 | — | — | — | — |
| 62 | 0.06 | 0.12 | 0.28 | 0.014 | 0.0010 | 28.8 | 62.2 | 0.12 | 0.02 | 3.11 | 0.0011 | — | — | — | — |
| 63 | 0.06 | 1.55 | 1.52 | 0.018 | 0.0007 | 25.2 | 69.2 | 0.25 | — | 0.33 | 0.0022 | — | — | — | — |
| 64 | 0.07 | 1.67 | 0.54 | 0.016 | 0.0013 | 26.4 | 67.5 | 0.016 | — | 0.05 | 0.002 | — | — | — | — |

TABLE 7

(continued from Table 6)

| Test No. | Mo | Ta | W | Ti | V | Zr | Nb | Hf | B | Ca | Mg | Fe | fn1 | fn2 |
|---|---|---|---|---|---|---|---|---|---|---|---|---|---|---|
| 47 | 1.3 | — | — | — | — | — | — | 0.17 | — | — | — | 5.5 | 134 | 0.008 |
| 48 | 2.8 | — | — | — | — | — | — | — | 0.0041 | 0.0011 | — | 2.6 | 140 | 0.015 |
| 49 | — | — | — | — | 0.02 | — | — | — | — | 0.0044 | — | 3.4 | 126 | 0.00039 |
| 50 | 3.3 | — | — | 0.08 | — | — | 0.11 | — | 0.0028 | 0.0015 | — | 8.9 | 141 | 0.020 |
| 51 | — | — | 2.6 | — | — | 0.03 | — | — | 0.0051 | — | — | 7.9 | 110 | 0.00739 |
| 52 | — | — | — | — | — | — | 0.12 | — | — | — | — | 8.4 | 186 | 0.001 |
| 53 | — | — | — | 0.44 | — | — | — | 0.55 | — | — | — | 10.6 | 144 | 0.012 |
| 54 | — | — | — | — | — | — | — | — | — | — | 0.0025 | 15.6 | 100 | 0 |
| 55 | 1.2 | — | — | 0.03 | — | — | — | — | — | — | — | 9.2 | 95 | 0.007 |
| 56 | 6.8 | — | — | 0.02 | — | — | — | — | 0.0035 | 0.0015 | — | 0.4 | 94 | 0.036 |
| 57 | — | 0.42 | — | 0.15 | 0.01 | 0.22 | — | — | — | 0.0018 | — | 25.7 | 76 | 0.008 |
| 58 | — | — | — | — | — | — | — | — | — | — | — | 7.4 | 98 | 0 |
| 59 | — | — | — | — | — | — | — | — | — | — | — | 3.9 | 132 | 0 |
| 60 | — | — | — | — | — | — | — | — | — | — | — | 7.0 | 130 | 0 |
| 61 | — | — | — | — | — | — | — | — | — | — | — | 2.4 | 116 | 0 |
| 62 | — | — | — | — | — | — | — | — | — | — | — | 5.3 | 84 | 0 |
| 63 | — | — | — | — | — | — | — | — | — | — | — | 1.9 | 135 | 0 |
| 64 | — | — | — | — | — | — | — | — | — | — | — | 3.7 | 135 | 0 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)
The values in the Fe column are values rounded off to the first decimal place.

TABLE 8

| Test No. | C | Si | Mn | P | S | Cr | Ni | Cu | Co | Al | N | La | Ce | Nd | Y |
|---|---|---|---|---|---|---|---|---|---|---|---|---|---|---|---|
| 65 | 0.05 | 1.57 | 0.34 | 0.017 | 0.0005 | 25.7 | 66.8 | — | 0.018 | 0.12 | 0.0017 | — | — | — | — |
| 66 | 0.06 | 3.33 | 0.29 | 0.011 | 0.0006 | 25.9 | 67.4 | 0.11 | 0.18 | 0.11 | 0.0016 | — | — | — | — |
| 67 | 0.06 | 1.55 | 0.35 | 0.015 | 0.0005 | 25.6 | 58.7 | 0.06 | 0.01 | 0.06 | 0.0011 | — | — | — | — |
| 68 | 0.05 | 1.64 | 0.46 | 0.011 | 0.0014 | 28.8 | 60.2 | 0.04 | 0.01 | 0.07 | 0.0016 | — | — | — | — |
| 69 | 0.02 | 1.78 | 0.55 | 0.012 | 0.0015 | 29.3 | 61.1 | 0.03 | — | 0.05 | 0.0014 | — | — | — | — |
| 70 | 0.04 | 1.47 | 0.76 | 0.015 | 0.0018 | 31.2 | 60.2 | 0.05 | — | 0.08 | 0.0018 | — | — | — | — |
| 71 | 0.05 | 1.88 | 0.49 | 0.014 | 0.0015 | 30.4 | 57.8 | 0.06 | — | 0.26 | 0.0016 | — | — | — | — |
| 72 | 0.05 | 1.78 | 0.32 | 0.015 | 0.0014 | 27.5 | 59.5 | — | 0.12 | 0.03 | 0.0017 | — | — | — | — |
| 73 | 0.04 | 1.64 | 0.11 | 0.012 | 0.0007 | 28.5 | 63.5 | 0.16 | — | 0.09 | 0.0019 | 0.15 | — | — | — |
| 74 | 0.02 | 1.77 | 0.59 | 0.015 | 0.0001 | 27.6 | 66.5 | — | 0.05 | 0.15 | 0.0011 | — | — | — | — |
| 75 | 0.05 | 1.64 | 0.57 | 0.012 | 0.0005 | 29.2 | 61.2 | 0.12 | — | 0.45 | 0.0011 | — | — | — | — |
| 76 | 0.08 | 1.85 | 0.54 | 0.015 | 0.0004 | 31.2 | 57.5 | 0.09 | — | 0.16 | 0.0015 | — | — | — | — |
| 77 | 0.03 | 1.68 | 0.44 | 0.013 | 0.0008 | 27.4 | 58.8 | 0.08 | — | 0.25 | 0.0015 | — | — | — | — |
| 78 | 0.05 | 1.77 | 0.43 | 0.014 | 0.0007 | 25.4 | 57.8 | — | 0.02 | 0.06 | 0.0011 | — | — | — | — |
| 79 | 0.06 | 0.23 | 0.68 | 0.014 | 0.0001 | 26.2 | 62.5 | 0.04 | 0.06 | 3.15 | 0.0011 | — | — | — | — |
| 80 | 0.06 | 0.16 | 0.49 | 0.012 | 0.0015 | 30.5 | 64.6 | — | 0.77 | 3.11 | 0.0012 | — | — | — | — |
| 81 | 0.04 | 0.15 | 0.48 | 0.015 | 0.0017 | 31.0 | 64.7 | 0.09 | — | 3.35 | 0.0014 | — | — | — | 0.085 |
| 82 | 0.05 | 0.14 | 0.21 | 0.012 | 0.0016 | 27.4 | 62.5 | 0.87 | — | 2.95 | 0.0010 | — | — | — | — |

TABLE 9

(continued from Table 8)

| Test No. | Mo | Ta | W | Ti | V | Zr | Nb | Hf | B | Ca | Mg | Fe | fn1 | fn2 |
|---|---|---|---|---|---|---|---|---|---|---|---|---|---|---|
| 65 | — | — | — | — | — | — | — | — | — | — | — | 5.4 | 130 | 0 |
| 66 | — | — | — | — | — | — | — | — | — | — | — | 2.6 | 204 | 0 |
| 67 | 9.3 | — | — | — | — | — | — | — | — | — | — | 4.3 | 122 | 0.048 |
| 68 | — | 4.04 | — | — | — | — | — | — | — | — | — | 4.7 | 127 | 0.022 |
| 69 | — | — | — | 1.55 | — | — | — | — | — | — | — | 5.6 | 133 | 0.032 |
| 70 | — | — | — | — | — | — | 1.89 | — | — | — | — | 4.3 | 120 | 0.020 |
| 71 | — | — | — | — | — | — | — | — | 0.014 | — | — | 9.0 | 135 | 0 |
| 72 | — | — | — | 0.43 | — | — | — | — | — | — | — | 10.3 | 132 | 0.008 |
| 73 | — | — | — | — | — | — | — | — | — | — | — | 5.8 | 131 | 0 |
| 74 | — | — | — | — | — | 1.77 | — | — | — | — | — | 1.5 | 139 | 0.019 |
| 75 | — | — | — | — | — | — | 0.77 | — | — | — | — | 6.0 | 130 | 0.004 |
| 76 | — | — | 3.55 | — | — | — | — | — | — | — | — | 5.0 | 133 | 0.010 |
| 77 | — | — | — | 0.77 | — | — | — | — | — | — | — | 10.5 | 128 | 0.016 |

TABLE 9-continued (continued from Table 8)

| Test No. | Chemical composition (% by mass) | | | | | | | | | | | | | |
|---|---|---|---|---|---|---|---|---|---|---|---|---|---|---|
| | Mo | Ta | W | Ti | V | Zr | Nb | Hf | B | Ca | Mg | Fe | fn1 | fn2 |
| 78 | — | — | — | — | — | — | — | — | 0.016 | — | — | 14.4 | 129 | 0 |
| 79 | — | — | — | — | — | — | — | — | — | — | 0.013 | 7.1 | 88 | 0 |
| 80 | — | — | — | — | — | — | — | — | — | — | — | 0.3 | 94 | 0 |
| 81 | — | — | — | — | — | — | — | — | — | — | — | 0.1 | 88 | 0 |
| 82 | — | 0.77 | — | — | — | — | — | — | — | — | — | 5.1 | 92 | 0.004 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)
The values in the Fe column are values rounded off to the first decimal place.

TABLE 10

| Test No. | Chemical composition (% by mass) | | | | | | | | | | | | | | |
|---|---|---|---|---|---|---|---|---|---|---|---|---|---|---|---|
| | C | Si | Mn | P | S | Cr | Ni | Cu | Co | Al | N | La | Ce | Nd | Y |
| 83 | 0.05 | 1.57 | 0.34 | 0.017 | 0.0005 | 25.7 | 66.8 | — | 0.018 | 0.12 | 0.0017 | — | — | — | — |
| 84 | 0.06 | 3.33 | 0.29 | 0.011 | 0.0006 | 25.9 | 67.4 | 0.11 | 0.18 | 0.11 | 0.0016 | — | — | — | — |
| 85 | 0.06 | 1.55 | 0.35 | 0.015 | 0.0005 | 25.6 | 58.7 | 0.06 | 0.01 | 0.06 | 0.0011 | — | — | — | — |
| 86 | 0.05 | 1.64 | 0.46 | 0.011 | 0.0014 | 28.8 | 60.2 | 0.04 | 0.01 | 0.07 | 0.0016 | — | — | — | — |
| 87 | 0.05 | 0.04 | 0.51 | 0.024 | 0.0025 | 24.6 | 66.9 | — | — | 2.11 | 0.002 | — | — | — | — |
| 88 | 0.14 | 1.89 | 1.25 | 0.021 | 0.0008 | 22.1 | 28.2 | 0.44 | — | 0.41 | 0.001 | — | — | — | — |
| 89 | 0.06 | 0.04 | 0.19 | 0.015 | 0.0006 | 20.5 | 40.3 | 0.11 | — | 0.17 | 0.002 | — | — | — | — |
| 90 | 0.01 | 4.66 | 0.22 | 0.016 | 0.0015 | 21.1 | 67.8 | 0.28 | — | 0.04 | 0.001 | — | 0.025 | — | — |
| 91 | 0.06 | 0.11 | 0.23 | 0.022 | 0.0007 | 23.4 | 64.3 | 0.59 | — | 4.87 | 0.001 | 0.031 | — | — | — |
| 92 | 0.32 | 0.38 | 0.55 | 0.015 | 0.0008 | 23.5 | 61.3 | — | 0.25 | 2.78 | 0.072 | — | — | — | — |
| 93 | 0.03 | 1.52 | 0.35 | 0.025 | 0.0009 | 38.0 | 58.5 | 0.22 | 0.08 | 0.11 | 0.012 | — | — | — | — |
| 94 | 0.01 | 1.69 | 0.44 | 0.045 | 0.0007 | 14.5 | 65.4 | — | 0.78 | 0.35 | 0.024 | — | — | — | — |
| 95 | 0.02 | 0.15 | 0.35 | 0.018 | 0.0135 | 25.5 | 65.2 | 0.09 | 0.22 | 3.12 | 0.015 | — | — | — | — |
| 96 | 0.05 | 0.68 | 0.77 | 0.012 | 0.0019 | 26.3 | 63.9 | 0.35 | — | 2.69 | 0.089 | — | — | — | — |
| 97 | 0.06 | 2.61 | 0.68 | 0.015 | 0.0017 | 27.1 | 61.9 | 0.33 | — | 0.44 | 0.12 | — | — | — | — |
| 98 | 0.05 | 0.54 | 0.58 | 0.035 | 0.0015 | 26.8 | 63.4 | 0.34 | — | 2.88 | 0.0051 | — | — | — | — |
| 99 | 0.07 | 2.58 | 0.59 | 0.037 | 0.0008 | 25.8 | 63.1 | 0.41 | — | 0.25 | 0.0054 | — | — | — | — |
| 100 | 0.07 | 0.59 | 0.64 | 0.011 | 0.013 | 27.7 | 62.5 | 0.35 | — | 3.04 | 0.013 | — | — | — | — |

TABLE 11

(continued from Table 10)

| Test No. | Chemical composition (% by mass) | | | | | | | | | | | | | |
|---|---|---|---|---|---|---|---|---|---|---|---|---|---|---|
| | Mo | Ta | W | Ti | V | Zr | Nb | Hf | B | Ca | Mg | Fe | fn1 | fn2 |
| 83 | — | — | — | — | — | — | — | — | — | — | — | 5.4 | 130 | 0 |
| 84 | — | — | — | — | — | — | — | — | — | — | — | 2.6 | 204 | 0 |
| 85 | 9.3 | — | — | — | — | — | — | — | — | — | — | 4.3 | 122 | 0.048 |
| 86 | — | 4.04 | — | — | — | — | — | — | — | — | — | 4.7 | 127 | 0.022 |
| 87 | 2.3 | — | — | — | — | — | — | — | — | — | — | 3.5 | 79 | 0.012 |
| 88 | — | — | — | — | — | — | — | — | — | — | — | 45.5 | 110 | 0 |
| 89 | 1.1 | — | — | — | — | — | — | — | — | — | — | 37.5 | 87 | 0.006 |
| 90 | — | — | — | — | — | — | — | — | 0.0033 | — | — | 5.8 | 257 | 0 |
| 91 | — | — | — | — | — | — | — | — | — | 0.0014 | — | 6.4 | 99 | 0 |
| 92 | — | — | — | 0.02 | — | — | — | — | — | 0.0015 | — | 10.8 | 96 | 0.00039 |
| 93 | — | — | — | — | — | — | — | — | — | — | — | 1.2 | 123 | 0 |
| 94 | — | — | — | — | 0.02 | — | — | — | — | 0.0016 | — | 16.7 | 144 | 0.00022 |
| 95 | — | — | — | — | — | 0.19 | — | — | 0.0027 | 0.0011 | — | 5.1 | 91 | 0.002 |
| 96 | — | — | — | — | — | — | — | — | — | — | — | 5.2 | 112 | 0 |
| 97 | — | — | — | — | — | — | — | — | — | — | — | 6.7 | 177 | 0 |
| 98 | — | — | — | — | — | — | — | — | — | — | — | 5.4 | 103 | 0 |
| 99 | — | — | — | — | — | — | — | — | — | — | — | 7.2 | 172 | 0 |
| 100 | — | — | — | — | — | — | — | — | — | — | — | 5.1 | 105 | 0 | fn1 = 40Si + Ni + 5Al + 40N + 10 (Cu + Co)
fn2 = (Mo/192) + (Ta/181) + (W/368) + (Ti/48) + (V/51) + (Zr/92) + (Nb/93) + (Hf/179)
The values in the Fe column are values rounded off to the first decimal place.

Test specimens having a parallel portion diameter of 10 mm and a length of straight portion of 110 mm were cut out from the ingot of each metallic material at a site 20 mm inside from the surface layer of the ingot, heated in an Ar atmosphere at 1,150° C. and then cooled to 900° C. at a rate of 100° C./minute using a Gleeble thermo-mechanical simulator and high temperature tensile testing was carried out at 900° C. and at a strain rate of 5 sec$^{-1}$ for hot workability evaluation. Each specimen was heated in a range of 36 mm and rapidly cooled with He gas after high temperature tensile testing.

The hot workability was evaluated on the basis of reduction in area (%) of the above-mentioned high-temperature tensile test. Empirically, it is known that when this value is not less than 50%, the material in question has such a level of hot workability and will not cause any troubles in production processes.

The ingot of each metallic material was forged, hot-rolled and cold-rolled in the conventional manner to give 6-mm-thick plates, which were subjected to solution heat treatment at 1,150° C. Test specimens, 4 mm thick, 10 mm wide and 20 mm long, were prepared therefrom.

The thus-prepared test specimens of each metallic material were subjected to a test which comprised holding them in an atmosphere consisting of 26% $H_2$-60% CO-11.5% $CO_2$-2.5% $H_2O$ (by volume) at 650° C. for 500 hours.

The surface deposit of each test specimen was then removed and subjected to ultrasonic cleaning, and the maximum thickness loss was determined using a depth meter in order to evaluate the metal dusting resistance. The investigation results are shown in Table 12 and Table 13.

TABLE 12

| Test No. | Reduction in area at 900° C. (%) | Maximum thickness loss (μm/hr) |
| --- | --- | --- |
| 29 | 90 | 0.005 |
| 30 | 90 | 0.006 |
| 31 | 80 | 0 |
| 32 | 89 | 0.002 |
| 33 | 72 | 0 |
| 34 | 86 | 0.009 |
| 35 | 70 | 0 |
| 36 | 85 | 0 |
| 37 | 94 | 0.007 |
| 38 | 78 | 0.001 |
| 39 | 82 | 0 |
| 40 | 82 | 0 |
| 41 | 74 | 0 |
| 42 | 74 | 0 |
| 43 | 82 | 0 |
| 44 | 85 | 0.005 |
| 45 | 70 | 0.001 |
| 46 | 70 | 0.003 |
| 47 | 86 | 0.002 |
| 48 | 86 | 0.001 |
| 49 | 72 | 0 |
| 50 | 74 | 0 |
| 51 | 75 | 0.002 |
| 52 | 70 | 0 |
| 53 | 76 | 0 |
| 54 | 80 | 0.001 |
| 55 | 80 | 0 |
| 56 | 82 | 0 |
| 57 | 80 | 0 |
| 58 | 80 | 0 |
| 59 | 85 | 0 |
| 60 | 85 | 0 |
| 61 | 83 | 0 |
| 62 | 84 | 0.004 |
| 63 | 82 | 0.012 |
| 64 | 83 | 0.005 |

TABLE 13

| Test No. | Reduction in area at 900° C. (%) | Maximum thickness loss (μm/hr) |
| --- | --- | --- |
| 65 | 80 | 0.005 |
| 66 | 72 | 0 |
| 67 | 70 | 0 |
| 68 | 60 | 0 |
| 69 | 60 | 0 |
| 70 | 60 | 0 |
| 71 | 65 | 0 |
| 72 | 66 | 0 |
| 73 | 72 | 0 |
| 74 | 62 | 0 |
| 75 | 70 | 0 |
| 76 | 60 | 0 |
| 77 | 66 | 0 |
| 78 | 70 | 0 |
| 79 | 70 | 0 |
| 80 | 85 | 0 |
| 81 | 72 | 0.002 |
| 82 | 72 | 0.001 |
| 83 | 75 | 0.005 |
| 84 | 80 | 0.001 |
| 85 | 80 | 0 |
| 86 | 80 | 0 |
| 87 | 88 | 0.135 |
| 88 | 85 | 0.188 |
| 89 | 90 | 0.242 |
| 90 | 48 | 0 |
| 91 | 44 | 0 |
| 92 | 40 | 0 |
| 93 | 42 | 0.003 |
| 94 | 45 | 0.002 |
| 95 | 40 | 0 |
| 96 | 40 | 0.001 |
| 97 | 40 | 0.001 |
| 98 | 42 | 0 |
| 99 | 44 | 0 |
| 100 | 47 | 0 |

From Table 12 and Table 13, it is evident that the metallic materials given test numbers 29–86 and satisfied with the chemical composition requirements specified herein show very small maximum thickness loses and are excellent in metal dusting resistance and, further, show large values of reduction in area at 900° C., hence are excellent in hot workability as well. On the contrary, the metallic materials given test numbers 87 to 89 and failing to meet the chemical composition requirements specified herein are poor in metal dusting resistance and the metallic materials given test numbers 90 to 100 are low in hot workability and not suited for use in part production on an industrial scale.

INDUSTRIAL APPLICABILITY

The metallic material of the present invention is excellent in metal dusting resistance and therefore can be utilized in manufacturing heating furnace pipes, piping systems, heat exchanger pipes and so forth to be used in petroleum refinery or petrochemical plants, among others, and the durability and safety of such unit or equipment can be markedly improved.

What is claimed is:

1. A metallic material having metal dusting resistance which comprises, in mass %, C: not more than 0.2%, Si: 0.01–4%, Mn: 0.05–2%, P: not more than 0.04%, S: not more than 0.015%, Cr: 10–35%, Ni: 30–78%, Al: not less than 0.005% but less than 4.5%, N: 0.005–0.2%, and one or both of Cu: 0.015–3% and Co: 0.015–3%, with the balance substantially being Fe, and of which the fn1 value defined by the formula (1) given below is not less than 50:

$$fn1 = 40Si + Ni + 5Al + 40N + 10(Cu + Co) \quad (1),$$

wherein, in the above formula (1), the symbols of the elements represent the contents, in mass %, of the elements in the metallic material.

2. A metallic material having metal dusting resistance which comprises, in mass %, C: not more than 0.2%, Si: 0.01–4%, Mn: 0.05–2%, P: not more than 0.04%, S: not more than 0.015%, Cr: 10–35%, Ni: 30–78%, Al: not less than 0.005% but less than 4.5%, N: 0.005–0.2%, and one or both of Cu: 0.015–3% and Co: 0.015–3% and further comprises at least one of the (a) group elements specified below, with the balance substantially being Fe, and of which the fn1 value defined by the formula (1) given below is not less than 50:

(a) Mo: 0.05–10%, Ta: 0.05–5%, W: 0.05–5%, Ti: 0.01–3%, V: 0.01–1%, Zr: 0.01–3%, Nb: 0.01–3% and Hf: 0.01–1%;

$$fn1=40Si+Ni+5Al+40N+10(Cu+Co) \qquad (1),$$

wherein, in the above formula (1), the symbols of the elements represent the contents, in mass %, of the elements in the metallic material.

3. A metallic material having metal dusting resistance which comprises, in mass %, C: not more than 0.2%, Si: 0.01–4%, Mn: 0.05–2%, P: not more than 0.04%, S: not more than 0.015%, Cr: 10–35%, Ni: 30–78%, Al: not less than 0.005% but less than 4.5%, N: 0.005–0.2%, and one or both of Cu: 0.015–3% and Co: 0.015–3% and further comprises at least one of the (a) group elements specified below, with the balance substantially being Fe, and of which the fn1 value defined by the formula (1) given below is not less than 50 and the fn2 value defined by the formula (2) given below is not less than 0.003:

(a) Mo: 0.05–10%, Ta: 0.05–5%, W: 0.05–5%, Ti: 0.01–3%, V: 0.01–1%, Zr: 0.01–3%, Nb: 0.01–3% and Hf: 0.01–1%;

$$fn1=40Si+Ni+5Al+40N+10(Cu+Co) \qquad (1);$$

$$fn2=(Mo/192)+(Ta/181)+(W/368)+(Ti/48)+(V/51)+(Zr/92)+(Nb/93)+(Hf/179) \qquad (2),$$

wherein, in the above formulas (1) and (2), the symbols of the elements represent the contents, in mass %, of the elements in the metallic material.

4. The metallic material, having metal dusting resistance according to claim 1, which further comprises at least one of the (b) group elements specified below in lieu of part of Fe:

(b) B: 0.0005–0.02%, Ca: 0.0005–0.02% and Mg: 0.0005–0.02%.

5. The metallic material, having metal dusting resistance according to claim 2, which further comprises at least one of the (b) group elements specified below in lieu of part of Fe:

(b) B: 0.0005–0.02%, Ca: 0.0005–0.02% and Mg: 0.0005–0.02%.

6. The metallic material, having metal dusting resistance according to claim 3, which further comprises at least one of the (b) group elements specified below in lieu of part of Fe:

(b) B: 0.0005–0.02%, Ca: 0.0005–0.02% and Mg: 0.0005–0.02%.

7. The metallic material, having metal dusting resistance according to claim 1, which further comprises at least one of the (c) group elements specified below in lieu of part of Fe:

(c) La: 0.005–0.3%, Ce: 0.005–0.3%, Nd: 0.005–0.3% and Y: 0.005–0.3%.

8. The metallic material having metal dusting resistance according to claim 2, which further comprises at least one of the (c) group elements specified below in lieu of part of Fe:

(c) La: 0.005–0.3%, Ce: 0.005–0.3%, Nd: 0.005–0.3% and Y: 0.005–0.3%.

9. The metallic material, having metal dusting resistance according to claim 3, which further comprises at least one of the (c) group elements specified below in lieu of part of Fe:

(c) La: 0.005–0.3%, Ce: 0.005–0.3%, Nd: 0.005–0.3% and Y: 0.005–0.3%.

10. The metallic material, having metal dusting resistance according to claim 1, wherein the content of Fe is over 0% but not more than 10%.

11. The metallic material, having metal dusting resistance according to claim 2, wherein the content of Fe is over 0% but not more than 10%.

12. The metallic material, having metal dusting resistance according to claim 3, wherein the content of Fe is over 0% but not more than 10%.

13. The metallic material, having metal dusting resistance according to claim 1, which is intended for use in an atmosphere at 1,000° C. or below in which the total content of hydrocarbons, CO and $H_2$ is not less than 25% by volume and the total content of hydrocarbons and CO is not less than 1% by volume.

14. The metallic material, having metal dusting resistance according to claim 2, which is intended for use in an atmosphere at 1,000° C. or below in which the total content of hydrocarbons, CO and $H_2$ is not less than 25% by volume and the total content of hydrocarbons and CO is not less than 1% by volume.

15. The metallic material, having metal dusting resistance according to claim 3, which is intended for use in an atmosphere at 1,000° C. or below in which the total content of hydrocarbons, CO and $H_2$ is not less than 25% by volume and the total content of hydrocarbons and CO is not less than 1% by volume.

16. A double- or multi-layer metallic material which comprises one layer or a plurality of layers made of the metallic material, having metal dusting resistance according to claim 1, with at least one of the outermost layers being a layer of the above-mentioned metallic material having metal dusting resistance.

17. A double- or multi-layer metallic material which comprises one layer or a plurality of layers made of the metallic material, having metal dusting resistance according to claim 2, with at least one of the outermost layers being a layer of the above-mentioned metallic material having metal dusting resistance.

18. A double- or multi-layer metallic material which comprises one layer or a plurality of layers made of the metallic material, having metal dusting resistance according to claim 3, with at least one of the outermost layers being a layer of the above-mentioned metallic material having metal dusting resistance.

19. A metal tube or pipe of which the material is the metallic material having metal dusting resistance according to claim 1.

20. A metal tube or pipe of which the material is the metallic material having metal dusting resistance according to claim 2.

21. A metal tube or pipe of which the material is the metallic material having metal dusting resistance according to claim 3.

22. A double- or multi-layer metal tube or pipe of which the material is the double- or multi-layer metallic material according to claim 16, with the outer surface being a layer of the metallic material having metal dusting resistance.

23. A double- or multi-layer metal tube or pipe of which the material is the double- or multi-layer metallic material according to claim 17, with the outer surface being a layer of the metallic material having metal dusting resistance.

24. A double- or multi-layer metal tube or pipe of which the material is the double- or multi-layer metallic material according to claim 18, with the outer surface being a layer of the metallic material having metal dusting resistance.

* * * * *

UNITED STATES PATENT AND TRADEMARK OFFICE
CERTIFICATE OF CORRECTION

PATENT NO.   : 6,623,869 B1
DATED        : September 23, 2003
INVENTOR(S)  : Nishiyama et al.

It is certified that error appears in the above-identified patent and that said Letters Patent is hereby corrected as shown below:

<u>Title page,</u>
Item [73], Assignee, please insert -- Sumitomo Metal Industries, Ltd., Osaka (JP) --

Signed and Sealed this

Thirteenth Day of April, 2004

JON W. DUDAS
*Acting Director of the United States Patent and Trademark Office*